United States Patent [19]

Dokas

[11] Patent Number: 5,628,625
[45] Date of Patent: May 13, 1997

[54] HIGH PRESSURE FLUID PUMP FOR USE IN VEHICULAR BRAKING SYSTEM HAVING ANTI-LOCK AND TRACTION ASSIST FEATURE

[75] Inventor: David M. Dokas, Redford, Mich.

[73] Assignee: Kelsey-Hayes Company, Ann Arbor, Mich.

[21] Appl. No.: 537,542

[22] Filed: Oct. 2, 1995

Related U.S. Application Data

[63] Continuation of Ser. No. 311,554, Sep. 23, 1994, abandoned.

[51] Int. Cl.⁶ .................................................. F04B 53/00
[52] U.S. Cl. ........................ 417/523; 417/569; 417/549; 92/72; 303/116.4
[58] Field of Search .................... 417/549, 554, 417/566, 567, 569, 523; 92/72, 172; 137/539; 251/284; 303/10, 116.4

[56] References Cited

U.S. PATENT DOCUMENTS

| | | | |
|---|---|---|---|
| 2,329,087 | 10/1943 | Russell | 137/539 |
| 2,537,336 | 1/1951 | Ericson | 417/549 |
| 2,622,539 | 12/1952 | Martin | 417/549 |
| 3,009,423 | 11/1961 | Leissner | 417/549 |
| 3,259,076 | 7/1966 | Halberg et al. | 417/549 |
| 3,659,504 | 5/1972 | Zurcher | 92/162 R |
| 4,101,074 | 7/1978 | Kiwior | 239/585 |
| 4,715,666 | 12/1987 | Farr . | |
| 4,778,039 | 10/1988 | Miller | 92/140 |
| 4,893,650 | 1/1990 | Chisholm et al. | 137/539 |
| 5,086,802 | 2/1992 | Spears | 137/68.1 |
| 5,100,305 | 3/1992 | Zirps | 417/523 |
| 5,176,428 | 1/1993 | Lebret | 303/116.4 |
| 5,199,860 | 4/1993 | Stegmaier | 417/569 |
| 5,213,482 | 5/1993 | Reinartz | 417/523 |
| 5,232,272 | 8/1993 | Eckstein et al. | 417/569 |

FOREIGN PATENT DOCUMENTS

| | | | |
|---|---|---|---|
| 0288981 | 11/1988 | European Pat. Off. | 417/554 |
| 2606454 | 5/1988 | France | 137/539 |
| 4028941 | 10/1991 | Germany | 417/549 |

*Primary Examiner*—Timothy Thorpe
*Assistant Examiner*—Ted Kim
*Attorney, Agent, or Firm*—Brooks & Kushman P.C.

[57] ABSTRACT

A pump for a vehicle braking or traction control system integrated into a hydraulic control unit. The housing for the hydraulic control unit has at least one counterbore in which a cylindrical sleeve is disposed. The cylindrical sleeve has a counterbore which is open at one end and closed at the other. A piston is reciprocal in the counterbore by a motor driven cam. The piston, in conjunction with the closed end of the sleeve, forms a pumping chamber having an outlet port provided through the closed end of the sleeve. Low pressure brake fluid is received into the pumping chamber through an axial fluid passageway and a one-way check valve. A piston support land is provided on the internal surface of the cylindrical sleeve and a mating opposing land is provided on the external surface of the piston. The opposing land has a plurality of equally spaced annular grooves which entrap sufficient fluid to provide a uniform fluid film between the piston support and opposing lands.

19 Claims, 3 Drawing Sheets

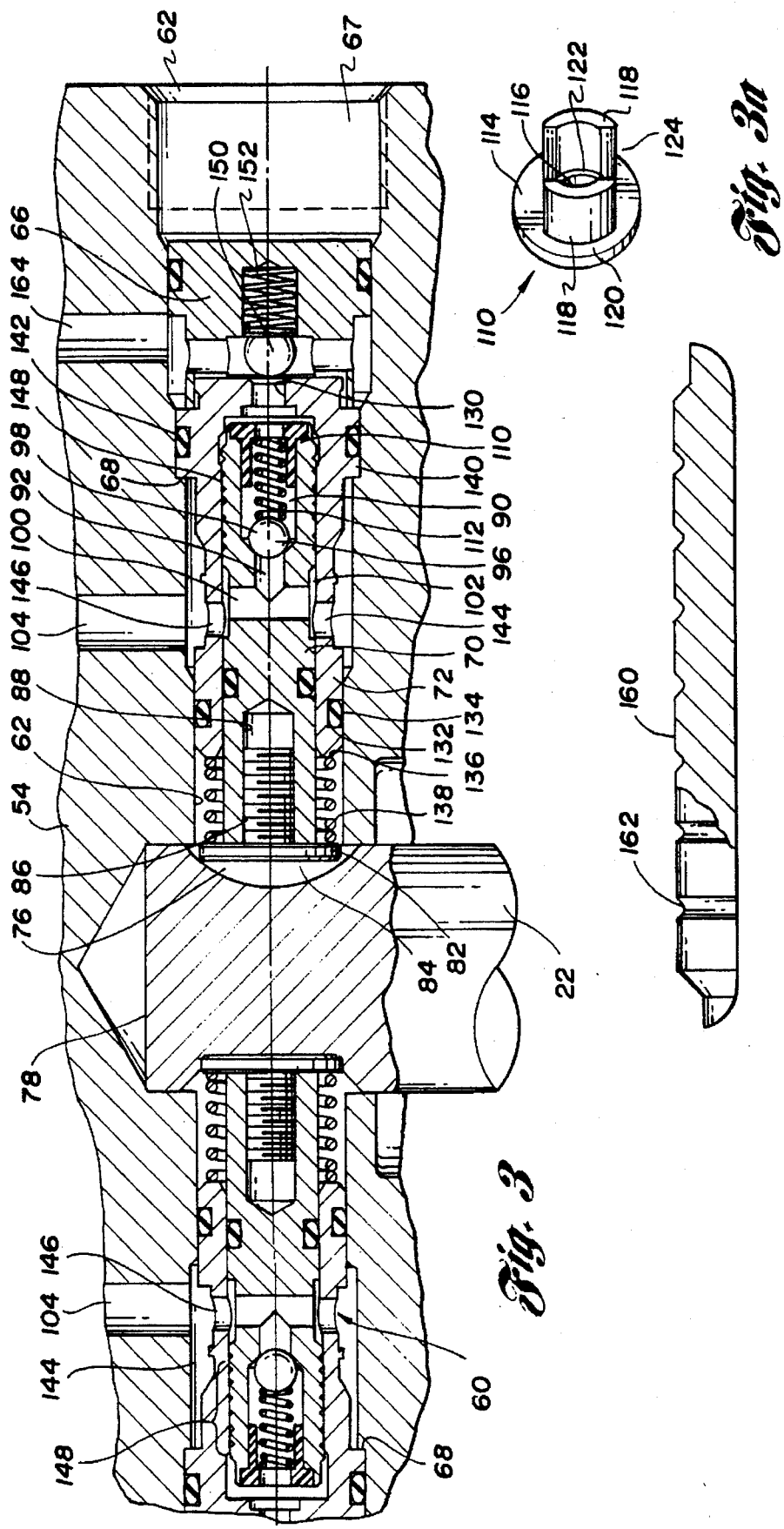

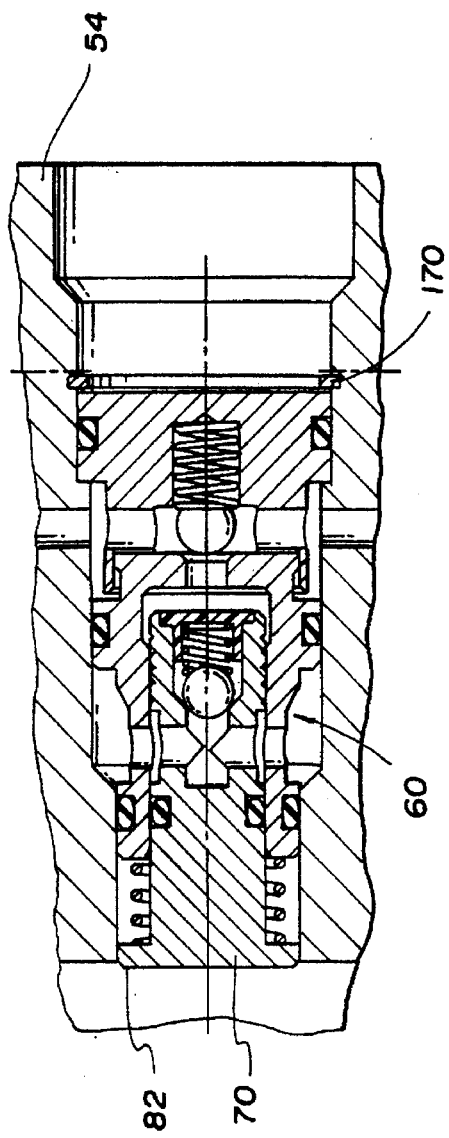
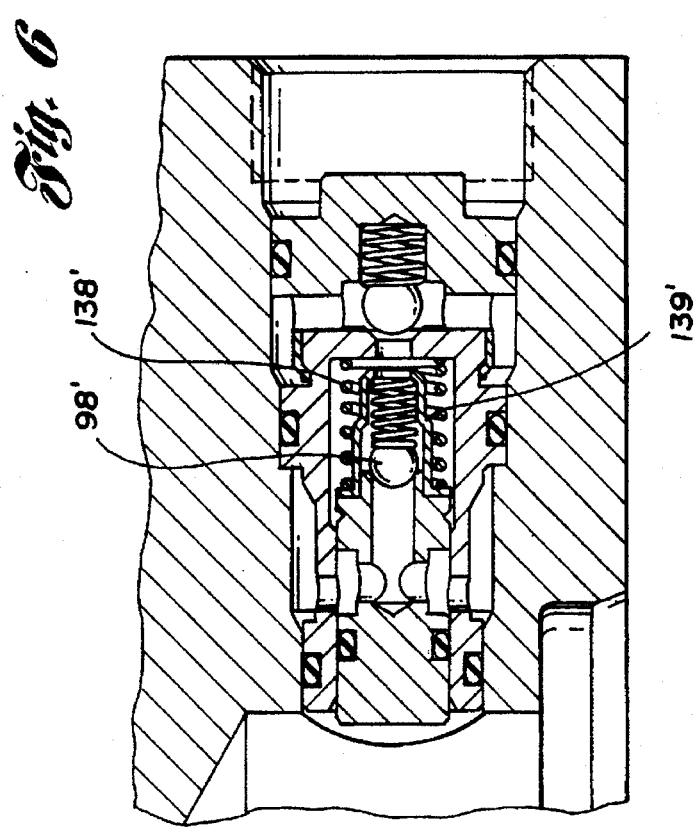
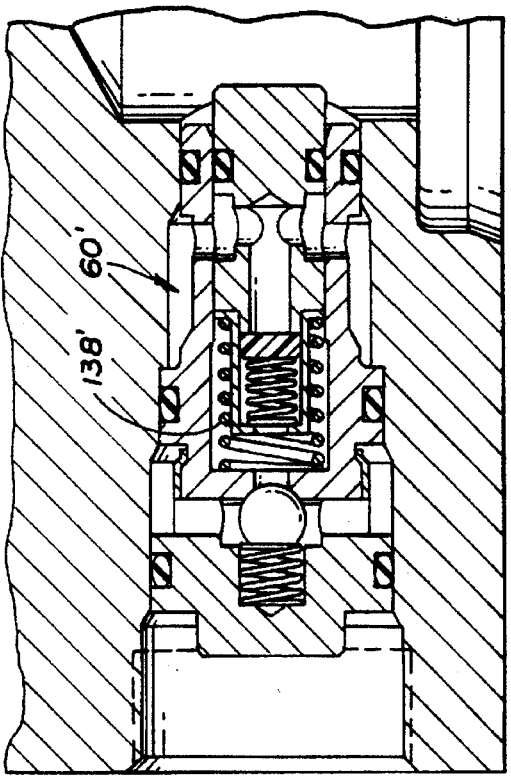
Fig. 5
Fig. 6
Fig. 7 PRIOR ART

HIGH PRESSURE FLUID PUMP FOR USE IN VEHICULAR BRAKING SYSTEM HAVING ANTI-LOCK AND TRACTION ASSIST FEATURE

"This is a continuation of application Ser. No. 08/311,554 filed on Sep. 23, 1994", now abandoned.

TECHNICAL FIELD

This invention relates to high speed, high pressure hydraulic pumping units, particularly opposed piston-type pumps for use in vehicular anti-lock brake systems ("ABS") including those having integrated traction assist ("TA") features, i.e., ABS/TA pumps.

BACKGROUND ART

In any conventional ABS system in use on vehicles today, there is generally provided an electric motor-driven opposed piston-type pumping unit for supplying pressurized brake fluid to any one of the brakes on instant, automatically controlled demand. The electrically-driven motor is a part of the ABS unit and includes a driveshaft which will include one or more cam lobes. Transversely disposed of the driveshaft, generally at 180° from one another, are a pair of pumping pistons within a respective pump body. The output of each pumping piston provides high pressure brake fluid, generally in the order of 2500 psi, to a respective segment of the braking system. In other words, in a conventional braking system for a four-wheel vehicle, the braking system is divided into two separate braking segments beginning at a dual-chambered master cylinder. Each segment provides the braking force to a predetermined pair of wheels. One segment may be to the left front-right rear wheels, for example, while the other segment provides the braking power to the right front-left rear wheels. In this way, the vehicular braking system is generally considered fail-safe in that if braking pressure were for any reason to be lost to one segment or pair of wheels, the remaining half of the brake system would be functional and sufficient to bring the vehicle under control. The ABS system is typically integrated into the vehicular braking system in the same manner, thereby providing anti-lock braking characteristics from each of the pair of pumping units to a respective one of the braking system segments. Likewise, traction assist capabilities are commonly added to the ABS system in such a manner as to use the pump output for applying brake pressure to a wheel or wheels to preclude wheel slip. This means increased use of the common pump, and added concern for the cost, performance attributes of the pump.

Due to the performance demanded of the ABS unit, it is important that the pumping unit provide high pressure brake fluid to the system as efficiently and quickly as possible.

Further, it is important that manufacturing costs be minimized and that performance reliability be maximized.

It is also important that the overall noise or decibel levels of the pump when it's running be kept to a minimum so as to be imperceptible to the operator. That is, while braking situations requiring employment of the ABS/TA system are quite rare, it is common practice to provide a diagnostic check of the system including operating momentarily the hydraulic pumps, each time the vehicle is started. Obviously, it is important that the operator of the vehicle, when first starting the vehicle, not be concerned in any way with noise generated from the brake diagnostic checking system.

SUMMARY OF THE INVENTION

The present invention contemplates an ABS system pumping unit as above-described providing a superior hydraulic seal between the piston and piston housing separating the working chamber from the brake fluid inlet to the pumping unit, thereby significantly reducing or eliminating the loss of working fluid from the pumping chamber, with the inherent result that the pumping unit will be more flow efficient and be able to more quickly respond to providing high pressure fluid at the instant it is required.

The invention also contemplates a pumping unit as above-described wherein by providing for increased seal efficiency as described in the preceding paragraph, a dynamic axial alignment of the piston relative to the housing is also significantly improved, thereby reducing the torque required of the electric motor to drive the pumping unit, with the end result that the electric motor may be downsized from those conventionally in use on similar prior art applications.

The invention also contemplates a pumping unit of the type as above-described wherein the number of components within the pumping unit is maintained at a minimum, thereby reducing expense and increasing overall product reliability. Of particular importance is providing an inlet valve designed as a ball valve, preferably of lightweight, wear resistant material such as ceramic, thereby eliminating concerns regarding its durability as well as providing the means whereby the valve seat for the ball valve may conveniently be coined by a slightly larger ball of steel, thus improving the surface finish and geometry of the valve seat.

The present invention further contemplates an ABS brake system pump wherein each of the opposed reciprocating pumping units is designed such that the unswept volume of braking fluid within each unit is maintained at an absolute minimum, thereby effectively increasing the response time of the fluid by reducing or eliminating that factional time moment required to compress the fluid prior to ejecting it from the pump chamber at the required working pressure.

The present invention also contemplates providing means for limiting and controlling the travel of the ball-type inlet check valve, thereby enhancing the response time for closing the valve, as well as total cycle time.

Finally, the invention contemplates a hydraulic reciprocating piston-type pump for use in a vehicular anti-lock braking system. The pump comprises a sleeve having a counterbore open at one end and closed at its other end having a low pressure inlet port intermediate both ends. A cylindrical, axially extending piston is received within the sleeve counterbore. The piston includes a pilot section at the end of predetermined outer diameter and a piston head extending radially beyond the pilot section. A spring means is mounted on the pilot section and bearing against the piston head for biasing the piston from the sleeved whereby the piston is biased into continuous engagement with the means provided for driving the pump.

Where reference is made throughout to an ABS system, it should be understood to include any such system as may or may not be provided with a traction control system, and that the pump of the subject invention can be used as the pump of an integrated ABS/TC system or alone with either of the ABS and TC systems.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a plan view showing in cross-section an enlarged view of the ABS control unit housing including a full cross-sectional view of the pump unit of the present invention in accordance with one embodiment thereof;

FIG. 3A is a perspective view of the ball travel limiter shown in FIG. 3 in accordance with the present invention;

FIG. 4 is a partial cross-sectional view of a portion of the pump end of the pump piston in accordance with the present invention and displays the lengthened support land and multiple, self-alignment enhancing annular brake fluid retaining grooves.

FIG. 5 is an elevation view shown in cross-section of a second embodiment of the pumping unit in accordance with the present invention;

FIG. 6 is an elevation view shown in cross-section of a third embodiment of the pumping unit in accordance with the present invention; and FIG. 7 is an elevation view in cross-section showing a conventional pumping unit for comparative purposes with the present invention.

BEST MODES FOR CARRYING OUT THE INVENTION

Figure 1:
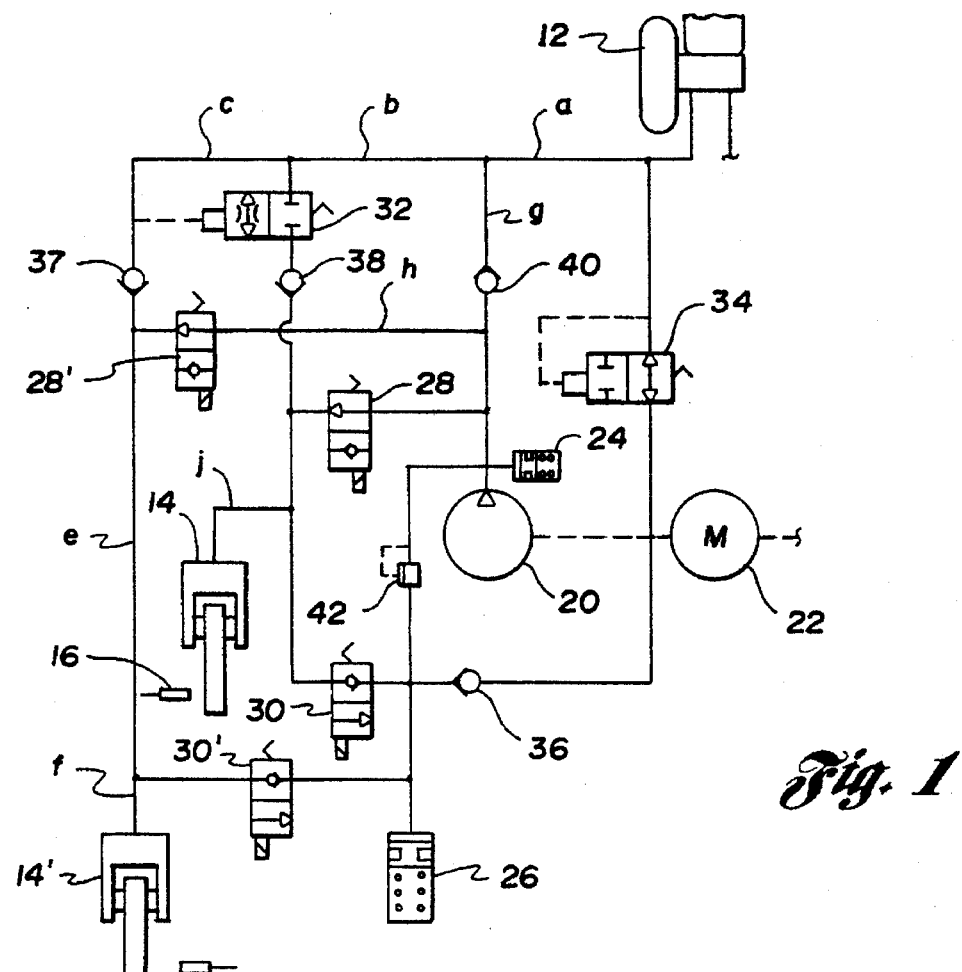
FIG. 1 is a schematic view of one-half of a diagonal type vehicular braking system including an ABS unit.
Figure 2:
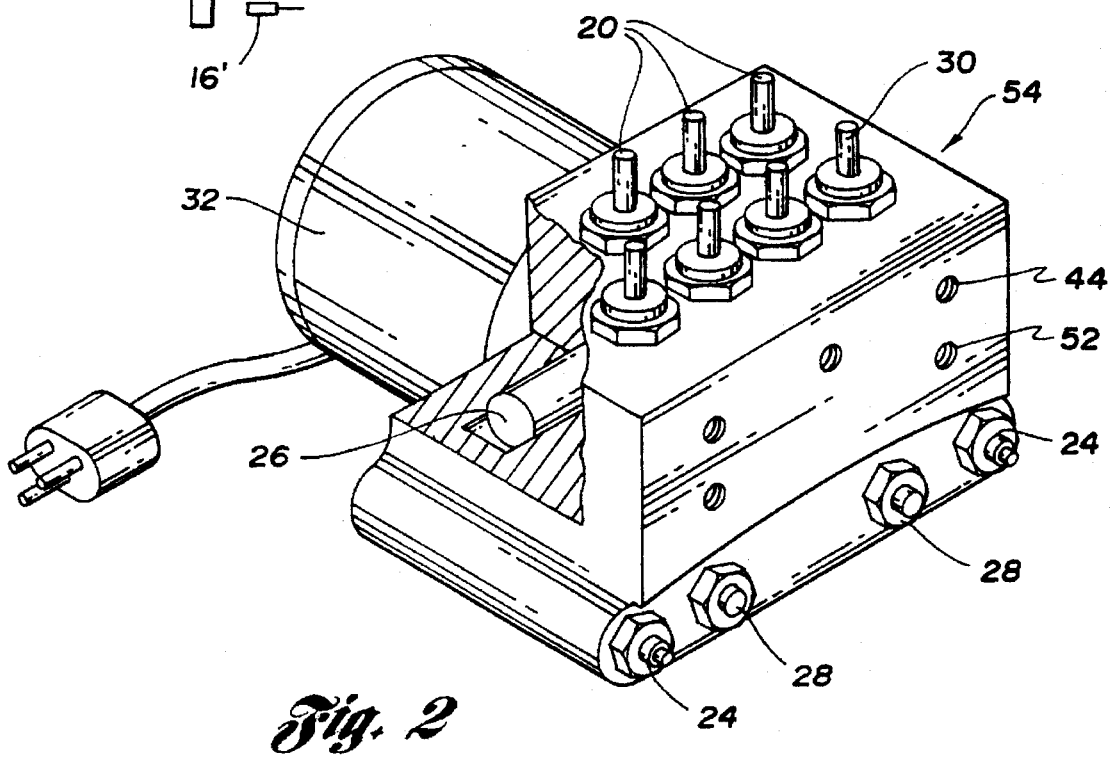
FIG. 2 is a perspective view shown partially in cross-section of an ABS control unit showing in partial cross-section the electric motor and driveshaft in combination with the opposed piston pumping units.

In FIGS. 1 and 2, as background supplemental information, there is shown a schematic of the hydraulic circuit and components in the circuit for an anti-lock brake system coupled with traction assist (FIG. 1) and an integrated electrical/hydraulic control unit (FIG. 2). By themselves, the disclosures in FIGS. 1 and 2 form no part of the present invention.

As seen in FIG. 1, a conventional braking system, generally designated 10 is provided with an anti-lock braking unit generally designated 12. The braking system 10, exclusive of the ABS unit 12, includes a brake pedal 14 acting on a master cylinder 16 to provide brake fluid under pressure to a slave cylinder 18 of a wheel brake assembly, e.g. a disc brake as shown. The ABS unit 12 includes an isolation valve 20, hold/dump valve 22, low pressure accumulator 24, pump 26, attenuator 28 and orifice 30. During normal braking (i.e. no wheel lock-up), the operator applies foot pressure to the brake pedal 14 causing the master cylinder 16 to provide brake fluid under pressure through the isolator valve 20 to slave brake cylinder 18, thereby providing driver modulated or controlled braking of one of the vehicle wheels through this brake.

If a brake locking condition is sensed at the brake by a sensor (not shown), the solenoid actuated isolation valve 20 is then opened as needed to reduce brake pressure by allowing flow into the low pressure accumulator 24. The pump 26 pumps fluid at a pressure of about 2500 psi as supplied from the accumulator 24 to the inlet side of the isolation valve 20. Upon lock-up ceasing, the hold/dump valve 22 is closed and the isolation valve 20 is opened as needed whereby high pressure fluid is again applied to the controlled brake 18.

The non-illustrated remaining portion of the brake system is identical to that shown as applied to the remaining driven and non-driven wheels. Pump 26 is a dual opposed piston, reciprocating piston-type pump driven by a motor 24 (FIG. 2). One pump piston feeds one-half of the system i.e. two slave cylinders 18 and associated wheel brake assemblies and the opposed piston (not shown) feeds the other one-half of the system.

As seen in FIG. 2, the electric motor and electrical/hydraulic control unit is basically integrated into one module generally designated 54 containing all of the isolation valves 20 and hold/dump valves 22 for controlling a four-wheel vehicle. The electrical motor 32 is connected to the control module at one side thereof, with the rotary crankshaft being received within the control module and driving opposed pistons, as described below. The various fluid lines are provided within the control module, with each leading to the control valves and/or accumulators and other valve-type components previously described.

In FIG. 3, there is shown the particular construction of the reciprocating dual piston-type pumping unit of the present invention. A single pumping unit or pump piston and sleeve assembly is generally designated 60. It is concentrically received within a stepped counterbore 62 located within the control module or housing 54. It is held axially in place within the housing by means of an O-ring sealed, retaining plug-type check valve assembly 66 and end cap 67 which is threadedly secured to the housing and bears against an end of the valve assembly 66, forcing it to seat the sleeve upon one of the shoulders 68 within the housing counterbore 62.

The pump unit 60 includes a piston 70 concentrically received in sliding engagement with the sleeve 72. The piston includes a drive section or pilot section at one end operating off of the cam portion 76 of driveshaft 78 of the electric motor 32, and a pump section at its other end. At the pilot section there is provided a piston head member 82 which includes an enlarged circular head 84 riding on the cam lobe 76 of the driveshaft and a concentric axially extending stem 86 on the other side of the head. The stem is received in sliding engagement within a bore 88 of the piston. The axial length of the stem 86 is at least equal to its diameter, preferably twice its diameter, thereby eliminating a tendency of the piston head member 82 to wobble or yaw relative to the axis of the piston. The pump end 80 of the piston includes a similar counterbore 90 which defines the pump chamber of the piston unit. Concentrically extending toward the mid-section of the piston, is an axially extending inlet passage 92 of reduced diameter relative to the bore 90, thereby providing at its juncture a seat 96 upon which is seated a ball valve 98, described below. In open communication with the fluid inlet 92 is a transversely oriented fluid inlet 100 which is in open fluid communication with an annular chamber defined by an annular groove 102 about the circumference of the piston 70. The axial length of the annular groove is such that it will always provide fluid communication through the sleeve 72 with the housing fluid passage 104.

Pump chamber 90 is closed at its other end by a ball valve travel limiting member 110 which additionally functions as a retainer for the compression-type ball valve return coil spring 112 which lightly maintains the ball valve 98 on seat 96 under a negligible force of approximately 0.04 Newtons.

Travel limiter 110 is shown in greater detail in FIG. 3A. It comprises a generally cylindrical one-piece member, preferably aluminum or other lightweight alloy as used for the remainder of pump unit 54 other than the sleeve and piston, which are preferably 1215 carburized steel and the springs which are also steel. It includes an annular end wall 114 having a concentrically located through port 116 and a pair of diametrically opposed arcuate posts 118. Posts 118 are sized and located relative to the end wall to provide an outer stop shoulder 120 for engaging the piston 70, an inner stop shoulder 122 for engaging spring 112, and a pair of flow slots 124 adequate to enhance flow through the inlet 92 and chamber 90 to piston outlet port 130.

Sleeve 72 includes an open ended section at its one end nearest the pump driveshaft which is slidingly received within the least diameter section of housing counterbore 62. This section includes an annular O-ring groove 132 for receiving an O-ring 134 to seal that end of the sleeve from the low pressure brake fluid coming through inlet passage 104 to the pump. The end of the sleeve at the open ended section forms a seat 136 upon which the coil-type compression spring 138 is captured between the sleeve and the piston head 84. The spring force provided is in the order of 27 Newtons. At the other end of sleeve 72, i.e. the closed end there is provided a radially extending O-ring flange 140 having an annular groove therein for receiving O-ring 142. The O-ring flange provides a shoulder against which the piston may be seated relative to the housing shoulder 68, as earlier described. A fluid chamber 144 is provided between the housing and sleeve as defined by a second section of the counterbore 62. The sleeve further includes a low pressure inlet port 146 at its mid-section communicating with the housing, fluid inlet 104 and piston inlet passage 96, previously described. Interiorly, sleeve 72 includes an annular piston support land 148 of predetermined length sufficient to (i) provide additional guidance and support of the piston in conjunction with the sleeve open ended section and (ii) provide an effective seal against high pressure fluid escaping the pump chamber. The opposing land 160 of the piston 70 is likewise lengthened as described below. At the pump end of the sleeve, there is provided a port 130 closed at its end by ball valve 150 compressibly seated against the sleeve by plug spring 152.

It will be noted that the volume of pump chamber 90 as enclosed between ball valves 98 and 150 is maintained at an absolute minimum of 0.073 cc for the example given herein. Specific statistical values are given below, describing an ABS/TA pump for a particular application. In the prior art as depicted in FIG. 7, this same volume is in the order of about 0.275 cc's. Thus, the volume has been reduced by a factor of 3.8. With this reduction in volume coupled with limiting the travel of ball 98 to the ends of posts 118 of the travel limiter 110, the response time of the pump unit has also been increased by a factor of about 3.8.

The working stroke of the pump within the sleeve is indicated at 1.83 mm.

A main feature of the invention is to increase the sealing efficiency of the pump piston relative to the sleeve so that none of the fluid being pressurized within the pump chamber is allowed to blow by the working end of the piston. To provide this, the pump features an extended piston support land 160 at the pump end of the piston, as shown in enlarged view in FIG. 4. It includes a series of equally spaced annular grooves 162 capable of entrapping sufficient brake fluid as to provide a uniform radial thin film lubricant which axially centers the piston within the sleeve as the pump piston 70 reciprocates within the sleeve 72. It is further provided that the clearance between the piston and sleeve in the area of the respective support lands 160, 148 be maintained at a minimum, generally in the order of about 0.005 mm to about 0.008 mm. As for the support land length, it is preferred that the axial length of the land 160 be about 5.60 mm. This compares with the conventional unit as shown in FIG. 7 wherein the corresponding land is in the order of 3.5 mm. Thus, the support land has been extended by a factor of 1.6. This, in combination with the close tolerance end sliding fit, serves the dual purpose of eliminating fluid blowback from the pump chamber and providing superior axial support and guidance, thereby eliminating the tendency of the piston to yaw back and forth transversely of its axis. By eliminating the tendency of the pump to yaw within the sleeve, the overall torque required to drive the reciprocating piston is reduced. Because of this reduction in required torque and increased flow, the motor itself can be downsized to one of lesser torque output, thereby downsizing the overall size of the ABS control unit, reducing weight, and saving cost, allowing lower pump speeds, which makes for a quieter valve.

As a design factor, in accordance with the present invention, the extended land section or support section 160 of the piston may be described in terms of its length relative to the piston diameter. In accordance with the invention, this ratio of support land 160 length to piston diameter will be in the range of 1:1 to 1:1.5, and is at 1:1.42 in the example given herein. In the prior art as represented in FIG. 7, this ratio is 1:2.25.

The ball valve 98 is a lightweight, highly wear-resistant, all ceramic ball. A preferred ball valve includes the following design criteria and material specifications: Material: $A_2O_3$; Compressive Strength: 58 GPa (giga pascals); Density: 3.86 gm/cm$^3$. Other alternative ceramic materials would include silicon carbide. Also compressive strengths ranging from 0.5 to 400 GPa and densities ranging from 1 to 10 gm/cm$^3$ are believed to be satisfactory for most applications.

As for valve seat 96, it is formed by coining with a steel ball slightly larger in diameter than the ball valve 98. This assures a line contact at the seat with the ball valve. It also provides a valid manufacturing technique providing an exceptionally smooth seat surface attributable, at least in part, to the fact that no machining is required. Rather, the metal flows to assume the geometry and surface finish of the high strength, steel ball. Preferably, the forming ball diameter will be 4.0 mm diameter for a ball valve of 3.5 mm diameter; and the forming ball will be a class 24 ball bearing having a surface finish of 5 μm.

In operation, the pump unit operates in the manner described earlier. Thus, when for example, wheel slip is sensed and the traction system is activated, low pressure fluid will be present at line 104, and the sleeve and pump unit will be generally filled. The pump unit may be primed initially from low pressure accumulator 24, but otherwise will suck fluid from master cylinder 16 until the system is brought up to full outlet pressure. Within pump unit 60, as cam-shaped crankshaft 78 strokes piston 70 from no lift to maximum lift (right hand side of FIG. 3), ball valve 98 will be forced into engagement with the seat 96 by fluid pressure in pump chamber 90 plus spring force, and highly pressurized fluid will flow through port 130, unseating ball valve 150 and continuing to the housing output line 164 to provide braking force to a wheel.

On the downstroke (maximum lift to no lift), ball 150 will close under force of outlet spring 152. Also, ball check valve 98 will be momentarily lifted from seat 96, until its travel is stopped by travel limiter 110. Then, when at or nearly at the no lift point of crankshaft rotation, the force of spring 112 will be sufficient to return ball 98 to its seat. Then, the pump may cycle again.

FIGS. 5 and 6 show second and third embodiments, respectively, of the pump piston unit in accordance with the present invention. Like reference numerals are used to refer to the same features as above-described in connection with the embodiment of FIG. 3. Regarding FIG. 5, the difference in design centers primarily around the unit construction of the piston head and piston so as to be a completely integral one-piece construction. Thus, both the piston head member 82 and piston 70 are one solid member. Further, it will be noted that the threaded end cap 67 of FIG. 3 has been replaced by a snap-ring-type retainer 170 seated with the housing 54. Other than that, the construction is the same as earlier described in connection with FIG. 3.

Regarding FIG. 6, an integral piston is also provided but the return spring 138' is located within the pump working chamber. Also, the travel limiter 110' for ball valve 98' is hat-shaped and held in place by return spring 138' (as with the prior art of FIG. 7) but it includes the unique feature of having a stepped, restricted diameter portion forming a seat 139' which serves to limit travel of ball valve 98' to a minimum (as with the earlier described embodiments).

As earlier referenced, to highlight certain features of the present invention, one may consider the prior art pump unit 60' shown in FIG. 7. One notes that the piston sealing land is relatively short axially (with the length to diameter ratio being in the order of 1:2.25. Further, the piston return spring 138' is located within the pump working chamber, thereby increasing the overall volume of the chamber. Also, the check valve is constructed as a flat plate, thereby sacrificing the durability and efficiency attributes of the ball check valve of the present invention. In most other respects, the basic design and functional characteristics of the pump are essentially those as previously described relative to the subject invention.

While the best mode for carrying out the invention has been described in detail, those familiar with the art to which this invention relates will recognize various alternative designs and embodiments for practicing the invention as defined by the following claims.

What is claimed is:

1. A hydraulic reciprocating piston type pump comprising:

a sleeve having a sleeve counterbore open at one end, closed at the opposite end, a radially extending low pressure inlet port provided intermediate said open and closed ends, an axially extending outlet port provided a ball valve seat provided at the junction of said outlet port and the external surface of said closed end, and a piston support land provided along the internal surface of said sleeve counterbore;

an axially extending cylindrical piston received in said sleeve counterbore, said piston having a pilot section at one end extending in part outside said sleeve and at the opposite end a piston section disposed entirely within said sleeve, said piston section having an opposing land disposed on its external surface, said opposing land slidably engaging said piston support land, and having a diameter selected to form a fluid tight seal with said piston support land and having a plurality of equally spaced annular grooves therealong to provide a radial fluid film between said piston support and said opposing lands with the reciprocation of said piston in said sleeve;

a pump chamber provided within said piston section;

an axially disposed low pressure fluid inlet passage provided in said piston connecting said pump chamber to said low pressure inlet port of said sleeve;

a valve seat provided at the junction between the low pressure inlet passage and the pump chamber;

a check valve disposed in said pump chamber resiliently biased to engage said valve seat, said check valve displaced from said valve seat in response to said piston being displaced away from said closed end; and means for reciprocating said piston relative to said sleeve.

2. The pump as defined in claim 1 wherein said check valve is a ball, and further including ball travel limiting means situated within said pump chamber for limiting the axial extent to which the ball may be displaced from the valve seat.

3. The pump of claim 2 wherein said ball travel limiting means comprises an end cap fitted within said piston counterbore at one end opposite said ball valve, said end cap including a pair of arcuately-shaped and diametrically opposed posts extending axially inward from the end cap toward said ball valve and being disposed on a diameter less than that of said ball whereby the ball will seat on the ends of the respective said posts.

4. The pump as defined in claim 3 wherein said means for biasing the ball on the valve seat comprises a compression-type coil spring nested within the posts of said ball travel limiter, the diameter of said coil spring closely matching the inside diameter of said posts whereby the spring is in like contact with the legs and thereby restrained from any misalignment with the axis of the piston during both the compression and return strokes of the piston.

5. The pump as defined in claim 3 wherein said valve seat includes a spherical contact surface with said ball, and wherein said spherical contact surface is formed on a spherical diameter slightly larger than the diameter of the ball, thereby providing a line contact with the ball.

6. The pump as defined in claim 5 wherein said valve seat includes a surface finish of 5 μm.

7. The pump as defined in claim 6 wherein said piston and sleeve are an aluminum alloy having a hardness in the range of $R_c 60$–63, and wherein said check valve ball is made of ceramic.

8. The pump as defined in claim 5 wherein said valve seat is formed by coining said juncture with a steel ball of slightly larger diameter than said check valve ball.

9. The invention as described in claim 1 wherein said spring means is a compression-type coil spring mounted on said pilot section with one end of the spring abutting the piston head and the other end of the spring abutting the sleeve.

10. The invention as defined in claim 1 wherein the length of said piston support land is sufficient to preclude the piston skewing relative to the sleeve, and wherein the length of said opposing land of said piston relative to the diameter of said piston being in the range of about 1:1 to 1:1.5, and wherein said opposing land of said piston is supported in close tolerance sliding fit relation to the piston support land of said sleeve throughout the stroke of said piston.

11. A pump for a vehicle braking system including an anti-lock brake system or a traction assist brake system or both, comprising:

a housing having at least one housing counterbore provided therein, said housing counterbore having an internal end, an external end and a sleeve seat provided intermediate said internal and said external ends;

a motor attached to said housing, said motor having a shaft extending into said housing at said internal end of said housing counterbore, said shaft having cam means provided thereon;

a cylindrical sleeve disposed in said housing counterbore, said sleeve having a sleeve counterbore open at one end and closed at the other end, a radial flange engageable with said sleeve seat to limit the axial location of said sleeve in said housing counterbore relative to said cam means, a low pressure inlet port, a high pressure outlet port, and an internal piston support land provided along an internal surface of said sleeve, said piston support land having a predetermined diameter;

a cap fixedly received in said housing counterbore and attachable thereto to secure said sleeve in said housing counterbore with said radial flange abutted against said sleeve seat;

a cylindrical piston slidably received within said sleeve counterbore, said piston having a pilot section extending in part beyond said open end of said sleeve and a piston section enclosed within said sleeve, said pilot section having a head provided at the end opposite said piston section engageable with said cam means to reciprocate said piston with said motor, said piston section having an opposing land provided along an external surface thereof, said opposing land slidably engageable with said piston support land and having a diameter selected to provide a fluid seal between said piston support land and said opposing land in the region between said closed end of said sleeve and said inlet port, said opposing land having equally spaced annular grooves along the length thereof to entrap sufficient fluid to provide a uniform radial thin fluid film which axially centers the piston within the sleeve when the piston is reciprocated relative to the sleeve, said piston section further including a piston, counterbore forming a pump chamber adjacent the closed end of said sleeve, a coaxial low pressure fluid passage connecting said pump chamber to said low pressure input port and a valve seat provided at the junction of said low pressure fluid passageway and said piston chamber;

a spring member disposed between said head and said sleeve to resiliently bias said head against said cam such that said piston reciprocates within said sleeve with the rotation of said shaft;

a check valve disposed in said piston counterbore and biased to engage said valve seat when said piston is displaced towards said closed end of the sleeve and disengaged from said valve seat when said piston is displaced away from said closed end of said sleeve.

12. The invention as defined in claim 11 wherein said check valve is a ball, and further including ball travel limiting means situated within said piston counterbore for limiting the axial extent to which the ball may be displaced from the valve seat.

13. The pump of claim 1 wherein said ball travel limiting means comprises an end cap fitted within said piston counterbore at one end opposite said ball valve, said end cap including a pair of arcuately-shaped and diametrically opposed posts extending axially inward from the end cap toward said ball valve and being disposed on a diameter less than that of said ball whereby the ball will seat on the ends of the respective said posts.

14. The pump as defined in claim 13 wherein said means for biasing the ball on the valve seat comprises a compression-type coil spring nested within the posts of said ball travel limiter, the diameter of said coil spring closely matching the inside diameter of said posts whereby the spring is in like contact with the legs and thereby restrained from any misalignment with the axis of the piston during both the compression and return strokes of the piston.

15. The pump as defined in claim 13 wherein said valve seat includes a spherical contact surface with said ball, and wherein said spherical contact surface is formed on a spherical diameter slightly larger than the diameter of the ball, thereby providing a line contact with the ball.

16. The pump as defined in claim 15 wherein said valve seat includes a surface finish of 5 µm.

17. The pump as defined in claim 15 wherein said valve seat is formed by coining said juncture with a steel ball of slightly larger diameter than said check valve ball.

18. The pump as defined in claim 15 wherein said piston and sleeve are steel having a hardness in the range of $R_c 60$–63, and wherein said check valve ball is made of ceramic.

19. The invention as defined in claim 11 wherein said piston support land has a length sufficient to preclude the piston skewing relative to the sleeve, and wherein the length of said opposing Land of said piston relative to the diameter of said piston is in the range of about 1:1 to 1:1.5, and wherein opposing land of said piston is supported in close tolerance sliding fit relation to said piston support land of said sleeve throughout the stroke of said piston.

* * * * *

UNITED STATES PATENT AND TRADEMARK OFFICE
CERTIFICATE OF CORRECTION

PATENT NO. : 5,628,625
DATED : May 13, 1997
INVENTOR(S) : David M. Dokas

It is certified that error appears in the above-indentified patent and that said Letters Patent is hereby corrected as shown below:

In Claim 7, at column 8, line 35, "an aluminum alloy" should be deleted and -- steel -- should be inserted therein.

In Claim 19, at column 10, line 39, "Land" should be changed to "land".

Signed and Sealed this

Nineteenth Day of May, 1998

Attest:

BRUCE LEHMAN

*Attesting Officer*    *Commissioner of Patents and Trademarks*